(No Model.) 2 Sheets—Sheet 1.
R. D. GRAY & H. E. STAMMERS.
PHOTOGRAPHIC CAMERA.
No. 362,271. Patented May 3, 1887.
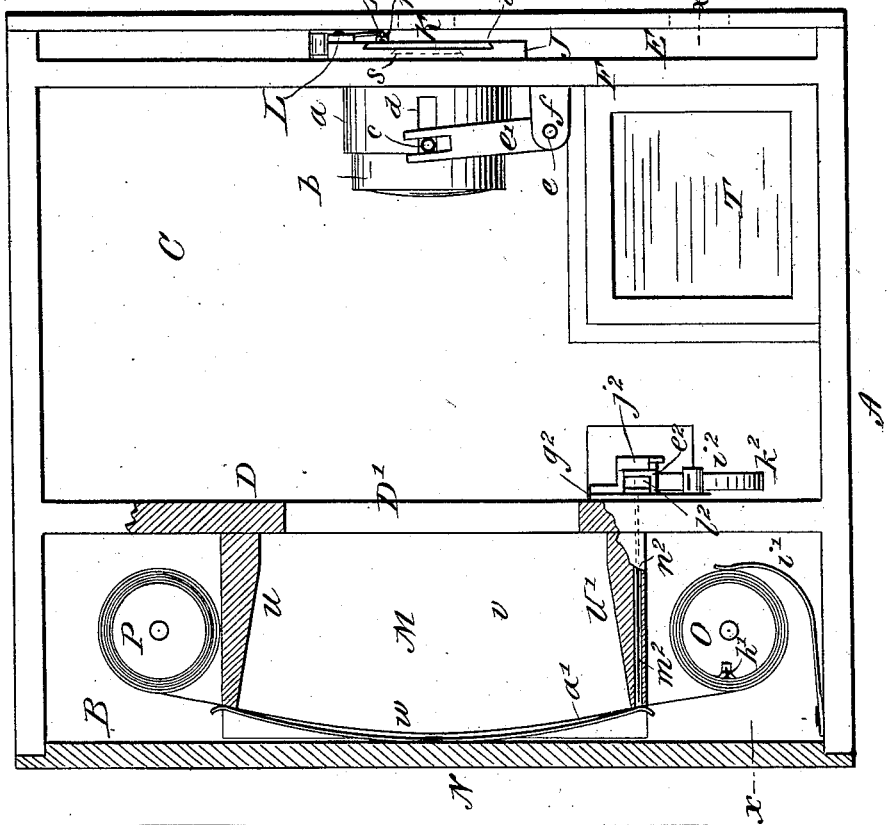
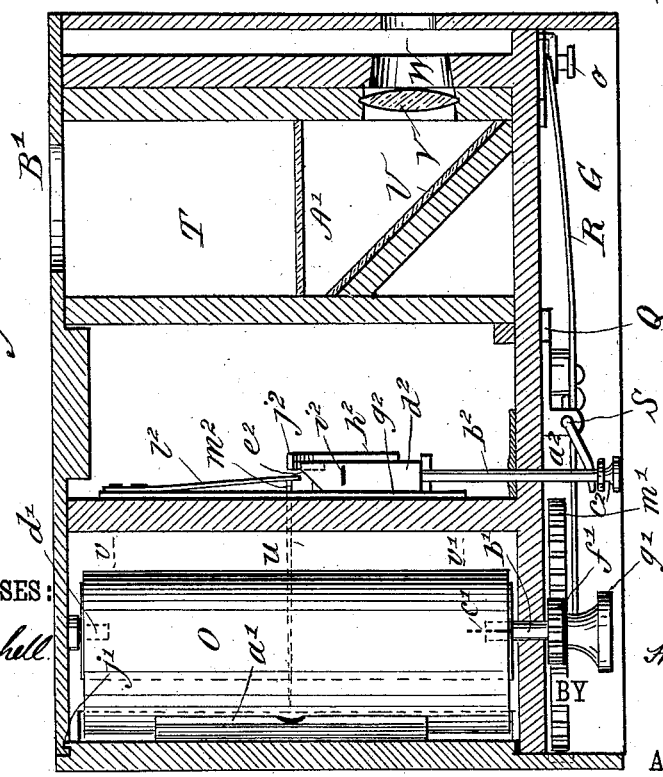
WITNESSES:
Donn Turtchell
C. Sedgwick
INVENTOR:
R. D. Gray
H. E. Stammers
BY Munn & Co.
ATTORNEYS.
N. PETERS, Photo-Lithographer, Washington, D. C.

(No Model.) 2 Sheets—Sheet 2.

R. D. GRAY & H. E. STAMMERS.
PHOTOGRAPHIC CAMERA.

No. 362,271. Patented May 3, 1887.

WITNESSES:
Donn Twitchell
C. Sedgwick

INVENTOR:
R D Gray
H E Stammers
BY Munn & Co
ATTORNEYS.

UNITED STATES PATENT OFFICE.

ROBERT D. GRAY AND HENRY E. STAMMERS, OF NEW YORK, N. Y.

PHOTOGRAPHIC CAMERA.

SPECIFICATION forming part of Letters Patent No. 362,271, dated May 3, 1887.

Application filed October 5, 1886. Serial No. 215,371. (No model.)

*To all whom it may concern:*

Be it known that we, ROBERT D. GRAY and HENRY E. STAMMERS, both of the city, county, and State of New York, have invented a new and Improved Photographic Camera, of which the following is a specification, reference being had to the annexed drawings, forming a part thereof, in which—

Figure 3:
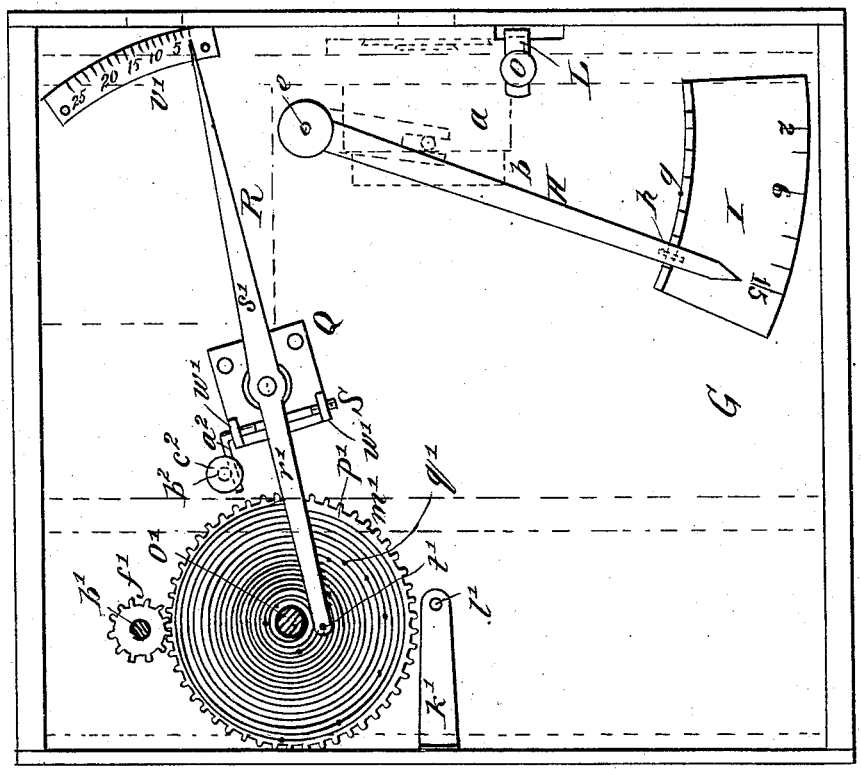
Figure 4:
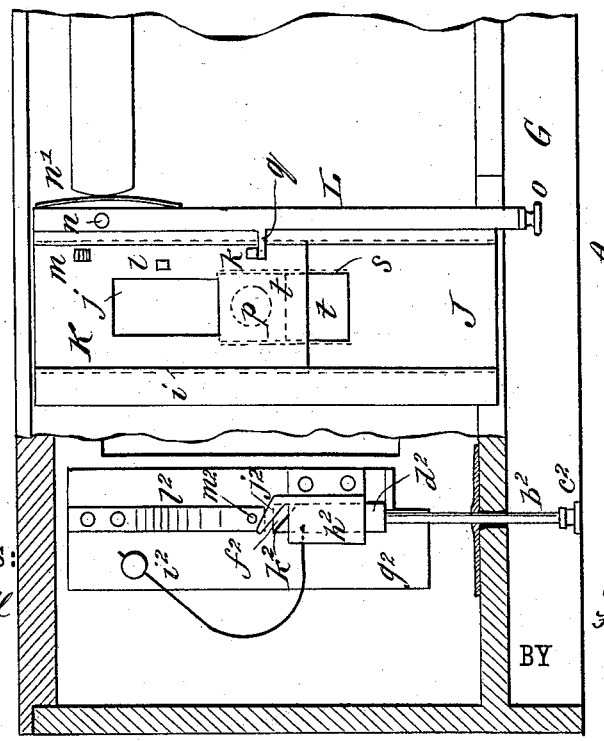

Figure 1 is a plan view, partly in section, of our improved camera. Fig. 2 is a vertical transverse section taken on line $x\,x$ in Fig. 1. Fig. 3 is an inverted plan view; and Fig. 4 is a front elevation, partly in section.

Similar letters of reference indicate corresponding parts in all the views.

The object of our invention is to construct a simple camera of the class known as "detective" cameras, in which the negatives are made upon a continuous strip of sensitized paper; also, to provide a device for spacing the paper, so that only the required surface will be exposed; also, to furnish a novel device for marking the paper after each exposure, so that the negative formed on the paper may be separated before the image is developed; also, to provide a shutter for effecting the exposure of the sensitized paper when the picture is to be taken, and which will close the aperture of the camera while the shutter is being set.

Our invention consists in a light-tight box provided with an adjustable lens-tube and having a support for holding the paper in a curved position while the picture is being taken, to compensate for the spherical aberration of the lens.

It also consists in an arrangement of rollers for holding and feeding the paper and a graduated stop device for stopping the roller after it has received the length of sensitized paper required for one negative.

It also further consists in a friction-spring for holding the paper under tension in position for exposure.

It also consists in an index for indicating the number of exposures made and in mechanism for perforating the paper after each exposure.

It also further consists in a drop-shutter provided with an auxiliary shutter for closing the aperture of the camera while the main shutter is being set.

It also consists in the arrangement of a finder in the lower part of the camera-box with a dark chamber above the finder to facilitate seeing the image formed on the ground glass of the finder, all as hereinafter more fully described.

The camera-box A is divided into two main compartments, B C, by the partition D, and the shutter-compartment E is separated from the main compartment C by the partition F. In the under side of the box is formed a recess, G, in which are located the levers, indexes, and other devices for operating the camera, as will presently be described.

In a central aperture in the partition F is secured a short tube, $a$, to which is fitted the lens-tube $b$, the said lens-tube being provided with studs $c$, which project through slots $d$ in diametrically-opposite sides of the short tube $a$. At the side of the tube $a$ a rock-shaft, $e$, is journaled in ears $f$, projecting from the inner side of the partition F. The rock-shaft $e$ is provided with slotted arms $e'$, which engage the studs $c$, projecting from the tube $b$, and the said rock-shaft extends downward through the bottom of the camera-box and carries an arm, H, which reaches over the curved scale I, secured to the bottom of the camera-box. The inner edge of the curved scale is provided with a notched flange, $g$, which is engaged by a projection, $h$, on the inner surface of the arm H. The scale I is graduated so that each division represents a certain focal distance of the lenses carried by the tube $b$, so that an approximate focus of the lens may be secured by moving the free end of the arm H to a point opposite a figure on the scale I representing approximately the distance between the object and the photographic camera.

To the outer surface of the partition F is secured a plate, J, having in its face a wide dovetailed groove, $i$, to which is fitted the main shutter K. The main shutter K has an oblong aperture, $j$, in the center thereof, and is provided with three lugs, $k\,l\,m$, projecting from its outer face near one edge, the lug $l$ being set nearer the center of the shutter than the lugs $k\,m$. To the front of the plate J, at one side of the dovetailed groove, is pivoted a lever, L, on the screw $n$. The lever L is held in a middle position by a centrally-supported spring, $n'$, bearing upon the lever on opposite sides of the pivot $n$. The longer arm of the lever L extends downward into the recess G, and is provided with a knob, $o$, for convenience in operating. A spring-arm, $q$, projects from the side of the lever L about opposite the aperture $p$ of the shutter, and is provided with an inwardly-turned end, $r$, which normally lies in the path of the lugs $k$ $m$. When the shutter is raised, in the manner presently to be described, preparatory to making an exposure, the lug $k$ rests upon the arm $q$ and supports the shutter in its upper position, and when the exposure is to be made, if it be a time exposure, the lever L is pushed toward the shutter, liberating the lug $k$, and at the same time bringing the inwardly-turned end of the arm $q$ into the path of the lug $l$, so that the shutter may drop until the lug $l$ strikes the arm $q$, when it will be arrested and the opening of the shutter will coincide with the opening of the plate J, and will remain in this position so long as the lever L is held in the position required to liberate the lug $k$. When the lever L is released, it is returned by the spring $n'$ to its normal position, thus releasing the lug $l$ and allowing the shutter to drop.

By employing a continuous roll of paper for receiving the impressions, the usual plate-holder and plate-holder slide commonly employed in cameras of this class are dispensed with, so that some means of closing the aperture of the camera while adjusting the shutter is necessary. To effect this we form a dove-tail groove, $s$, in the plate J, and place therein a small auxiliary shutter, $t$, which slides freely up and down in the groove.

When the shutter is closed after making an exposure, it is held in that position by the engagement of the lug $m$ with the arm $q$ of the lever L, the lug $m$ being beveled to cause it to slip under the arm $q$ as the shutter falls. When it is desired to set the shutter for another exposure, the camera is inverted, when the small auxiliary shutter $t$ falls in the groove $s$ and covers the aperture of the camera. The lever L is then pushed away from the shutter, liberating the lug $m$ from the arm $q$ and allowing the shutter to fall. The lever L then being released, regains its normal position above the lug $k$. It will thus be noticed that when the aperture $j$ of the shutter slips past the aperture of the camera the said aperture will be closed by the auxiliary shutter $t$. When the camera is reversed, the solid part of the shutter K will be held opposite the aperture of the camera by the engagement of the lug $k$ with the arm $q$, and the auxiliary shutter $t$ will fall away from its position over the aperture of the camera, leaving all the parts of the shutter in condition for an exposure.

If it is desired to make an instantaneous exposure the lever L is pushed away from the shutter, liberating the lug $k$ of the shutter, allowing it to fall to the bottom of the groove $i$, and in so doing to expose the sensitive plate while the aperture $j$ is passing the aperture of the camera; but when it is desired to make a time exposure the lever L is pushed toward the shutter, liberating the lug $k$ and bringing the arm $q$ into the path of the lug $l$, so that when the lug $l$ strikes the arm $q$ the shutter will be arrested with its aperture coincident with the aperture of the camera, and the exposure will last as long as the lever L is held in that position, and when the lever L is liberated the spring $n'$ returns it to its normal position, withdrawing the arm $q$ from the lug $l$ and allowing the shutter to complete its fall, and thus close the aperture of the camera. The engagement of the beveled lug $m$ with the arm $q$ causes the beveled lug to slip under the arm, thus engaging the lug, so that when the camera is inverted, as before described, for the purpose of setting the shutter, the shutter will be held in its position over the aperture of the camera until released by moving the lever L.

Within the compartment B of the camera-box A, and surrounding the aperture D' of the partition D, there is a box, M, formed of end pieces, $u$ $u'$, and side pieces, $v$ $v'$, the rear edges of the side pieces being rabbeted to form curved guides $w$ for guiding and supporting the photographic paper; and to the back N of the camera-box is secured a curved spring, $a'$, which presses on the sensitive photographic paper and holds it against the rear edges of the end pieces, $u$ $u'$.

In the compartment formed between the end $u'$ of the box M and the side of the camera-box A is journaled a roller, O, on a shaft, $b'$, extending through the side of the box from the recess G. The shaft $b'$ is slotted longitudinally, and is inserted in a hole formed in the end of the roller and provided with a cross-bar, $c'$, which is received in the slot of the shaft $b'$. The opposite end of the roller turns on a stud, $d'$, projecting inward from the opposite side of the box. Upon the shaft $b'$ in the recess G, is placed a pinion, $f'$, and outside of the pinion a milled head, $g'$, is secured to the said shaft for convenience in turning the shaft in the roller. The roller O is slotted longitudinally and provided with two spurs, $h'$, for engaging the end of the paper, which is to be wound upon the roller after being acted upon in the camera. The roller O, with its contents, is prevented from accidental rotation by a curved spring, $i'$, secured to the side of the camera-box and bearing on the paper carried by the roller.

The sensitive paper to be used in the camera is wound upon a plain roller, P, which is dropped into the compartment between the end $u$ of the box M and the side of the camera-box. The back N of the camera-box is provided with studs $j'$, which enter holes in the inner surface of the top of the camera-box, and the lower edge of the back is provided with a spring-catch, $k'$, which engages a stud, $l'$, projecting from the bottom of the camera-box. When it is desired to place the roll of sensitive paper in position for use in the camera-box, the back N, together with the spring $a'$ carried thereby, is removed from the camera box, and the roller P, loaded with paper, is inserted in its place simultaneously with the insertion of the roller O in its place, the end of the paper strip carried by the roll having previously been brought into engagement with the hooks $h'$ of the roller O. The back N is then replaced, the spring $a'$ being brought to bear upon the paper resting against the edges of the side pieces, and the paper will take the curvature of the guides $w$, upon which its edges rest. The curvature thus secured partly compensates for the spherical aberration of the lens.

The pinion $f'$ meshes into a spur-wheel, $m'$, journaled on a stud, $o'$, projecting from the bottom of the camera-box. In the face of the wheel $m'$ is formed a spiral groove, $p'$, in which are formed holes $q'$, located at varying distances from each other, proportionate to the progressive increase of the diameter of the paper-roll O.

To the bottom of the camera-box is secured a plate, Q, to which is pivoted a lever, R, having arms $r'$ $s'$. The arm $r'$ projects over the wheel $m'$ and is provided with a point, $t'$, which normally rests in the groove $p'$ in the wheel $m'$, and carries the point $t'$ into one of the holes $q'$ after each impression, so that the point $t'$ enters all of the holes $q'$ in succession. The arm $s'$ of the lever R is pointed, forming an index which extends over the curved scale $v'$, the scale being graduated to correspond to the number of exposed sections of the paper strip wound upon the roller O, so that as the quantity of paper increases upon said roller the point $t'$, traveling in the groove $p'$, will move the lever R so as to cause its index to point to a number of the scale $v'$ corresponding to the number of the exposure. Under the arm $r'$ of the lever R is journaled a rock-shaft, S, in ears $w'$, projecting from the plate Q, the rock-shaft being offset, so that when it is turned it will raise the arm $r'$, so as to disengage the point $t'$ from one of the holes $q'$. The rock-shaft S is provided with a right-angled arm, $a^2$, which projects toward the wheel $m'$. The rod $b^2$ projects through the bottom of the camera-box and is provided with a head, $c^2$, which extends over the arm $a^2$, so that whenever the head $c^2$ is pushed inward the rock-shaft S will be turned.

To the rod $b^2$ within the compartment C of the camera-box is attached a bolt, $d^2$, having a beveled end, $e^2$, and provided on its outer face with an oblique rabbet, $f^2$. The bolt $d^2$ slides between the base-plate $g^2$ and the guide $h^2$ secured thereto. The guide $h^2$ is opened upon one side, and the bolt $d^2$ is pressed into the guide $h^2$ by a curved spring, $i^2$, secured to the base-plate $g^2$. The outer surface of the guide $h^2$ is provided with an inclined finger, $j^2$, which is held in the path of the shoulder $k^2$, formed by the oblique rabbet $f^2$, so that when the bolt $d^2$ is pushed inward by pressure on the end of the rod $b^2$ it will be moved laterally by the engagement of the shoulder $k^2$ with the finger $j^2$. To the base-plate $g^2$ is secured a flat spring, $l^2$, whose free end lies in the path of the beveled end $e^2$ of the bolt $d^2$, and to the free end of the said spring $l^2$ is secured a needle, $m^2$, which extends upward through a hole in the end $n^2$ of the box M, in position to be projected through the paper resting upon the edge of the end of the box and through an opening formed in the end of the spring $a'$. When the bolt $d^2$ is pushed forward against the pressure of the spring $i^2$, it first engages the end of the spring $l^2$ and pushes the needle $m^2$ through the paper at the back of the box M, thus marking one edge of the exposed surface. The continued forward pressure of the rod $b^2$ brings the shoulder $k^2$ into engagement with the finger $j^2$, and pushes the bolt laterally until it is disengaged from the spring $l^2$, when the spring regains its normal position, with the needle $m^2$ withdrawn from the path of the sensitive paper. When the rod $b^2$ is released, the spring $i^2$ returns the bolt $d^2$ to the point of starting.

It will thus be seen that, after turning the roller O, by means of the milled head $g'$, when the point $t'$ is removed from the hole in the plate in the wheel $m'$ and is resting in the groove of the said wheel, when sufficient paper for making one exposure has been unrolled from the roller P and rolled upon the roller O, the point $t'$ will drop into another hole in the wheel $m'$, and will prevent the further turning of the roller O. When it is desired after an exposure to bring a new surface of the paper strip into position for use, the rod $b^2$ is pushed inward, puncturing the paper in the manner just described, at the same time turning the rock-shaft S so as to lift the arm $r'$ of the lever R and disengage the point $t'$ from the hole $q'$ in the wheel $m'$, thus permitting of another movement of the paper.

In one of the forward corners of the compartment C is inserted a rectangular box, T, in the lower part of which is supported a mirror, U, at an angle of forty-five degrees, and opposite the center of the mirror, in the front wall of the box, is secured a finder-lens, V, and in the front walls of the camera-box are formed apertures W, opposite the finder-lens. Above the mirror U in the box T is supported a ground-glass plate, A', in a horizontal position, and in the top of the camera-box is formed an aperture, B', through which the image thrown upon the ground glass by the mirror is viewed, the space between the ground glass and the top of the camera thus forming a dark chamber, which facilitates seeing the image.

Our improved camera may be finished and adapted for use without any special covering, or it may be arranged to be concealed in a traveling-bag or disguised in some other way.

Having thus fully described our invention, we claim as new and desire to secure by Letters Patent—

1. In a photographic camera, the combination, with a camera-lens uncorrected for spherical aberration, of a curved paper-support for holding the sensitive paper in the focus of the lens, substantially as specified.

2. In a photographic camera, the combination, with the sliding camera-tube, of a rock-shaft journaled in the camera-box, provided with arms engaging the camera-tube and having an index-lever and a scale provided with a notched flange for engagement with the said index-lever, substantially as specified.

3. In a photographic camera, the combination, with the curved paper guide and support, of a roller adapted to carry a supply of sensitive paper and a roller adapted to receive the sensitive paper after exposure, substantially as specified.

4. The combination, with the paper guide and support $w$, of the spring $a'$, arranged to press the paper at opposite ends of the exposed portion thereof, substantially as specified.

5. In a photographic camera, the combination, with the paper-holding roller, of a spirally-grooved wheel and indicating mechanism connected therewith, substantially as described.

6. In a photographic camera, the combination, with the paper-holding roller, of the spirally-grooved wheel $m'$, the lever R, provided with the point $t'$, and the scale $v'$, substantially as specified.

7. In a photographic camera, the combination, with the paper-receiving roller, of the spirally-grooved wheel $m'$, provided with holes $q'$, the lever R, provided with the point $t'$, adapted to slide in the spiral groove of the said wheel and fitted to the holes $q'$, and means for disengaging the point $t'$ from the holes $q'$, substantially as specified.

8. In a photographic camera, the combination, with the paper guide and support, of the needle $m^2$, the supporting-spring $l^2$, the sliding bolt $d^2$, provided with the beveled end $e^2$ and oblique shoulder $k^2$, the finger $j^2$, and the spring $i^2$, substantially as specified.

9. The combination, with the lever R and bolt-operating rod $b^2$, of the rock-shaft S, arranged to be operated by the said rod $b^2$, substantially as specified.

10. In a photographic camera, the combination, with the apertured shutter K, provided with the lugs $k\ l\ m$, of the lever L, provided with the arm $q$, and the double-acting spring $n'$, adapted to return the lever to a central position, substantially as specified.

11. In a photographic camera, the combination, with the main shutter K, provided with the aperture $j$, of the auxiliary shutter $t$, adapted to slide by gravity, so as to cover or uncover the aperture of the main shutter, as herein specified.

ROBERT D. GRAY.
HENRY E. STAMMERS.

Witnesses:
C. SEDGWICK,
E. M. CLARK.